United States Patent
Chernyak et al.

(10) Patent No.: US 12,517,577 B2
(45) Date of Patent: Jan. 6, 2026

(54) VIEWPOINT DETECTION DEVICE, CALIBRATION METHOD, AND PROGRAM

(71) Applicant: K.K. FOVE, Shibuya-Ku (JP)

(72) Inventors: Iakov Chernyak, Minato-ku (JP); Grigory Chernyak, Minato-ku (JP)

(73) Assignee: K.K. FOVE, Shibuya-ku (JP)

( * ) Notice: Subject to any disclaimer, the term of this patent is extended or adjusted under 35 U.S.C. 154(b) by 196 days.

(21) Appl. No.: 18/248,838

(22) PCT Filed: Oct. 12, 2021

(86) PCT No.: PCT/IB2021/059332
§ 371 (c)(1),
(2) Date: Dec. 26, 2023

(87) PCT Pub. No.: WO2022/079587
PCT Pub. Date: Apr. 21, 2022

(65) Prior Publication Data
US 2024/0134448 A1    Apr. 25, 2024

(30) Foreign Application Priority Data
Oct. 12, 2020    (JP) ................... 2020-172238

(51) Int. Cl.
*G06F 3/01*    (2006.01)
*G06T 5/50*    (2006.01)
(Continued)

(52) U.S. Cl.
CPC .............. *G06F 3/013* (2013.01); *G06F 3/012* (2013.01); *G06T 5/50* (2013.01); *G06T 7/13* (2017.01);
(Continued)

(58) Field of Classification Search
None
See application file for complete search history.

(56) References Cited

U.S. PATENT DOCUMENTS

| 2013/0308099 | A1  | 11/2013 | Stack |
| 2014/0191927 | A1* | 7/2014  | Cho ........................ G06F 3/011 345/8 |

(Continued)

FOREIGN PATENT DOCUMENTS

| JP | H0764709 A    | 3/1995  |
| JP | 2013252301 A  | 12/2013 |

(Continued)

OTHER PUBLICATIONS

International Search Report dated Dec. 14, 2021 for International Application No. PCT/IB2021/059332.

(Continued)

*Primary Examiner* — Talha M Nawaz (57) ABSTRACT

[Technical Problem] To perform calibration operations accurately and quickly.
[Solution to Problem] A gaze detection apparatus comprises an indicator presenting unit that presents an indicator to eyes and continuously moves the indicator in accordance with a predetermined trajectory; a gaze detecting unit that detects a gaze point of the eyes; and a numerical optimization problem solving unit that solves a numerical optimization problem in order to find a correction that converts a first set of detected plurality of the gaze points into a second set that satisfies a particular condition with respect to the predetermined trajectory.

5 Claims, 11 Drawing Sheets

(51) Int. Cl.
  *G06T 7/13* (2017.01)
  *G06T 7/50* (2017.01)
  *G06T 7/60* (2017.01)
  *G06T 7/80* (2017.01)
  *G06T 9/00* (2006.01)
  *G06V 10/141* (2022.01)
  *G06V 10/25* (2022.01)
  *G06V 40/18* (2022.01)

(52) U.S. Cl.
  CPC ............... *G06T 7/50* (2017.01); *G06T 7/60* (2013.01); *G06T 7/80* (2017.01); *G06T 9/00* (2013.01); *G06V 10/141* (2022.01); *G06V 10/25* (2022.01); *G06V 40/193* (2022.01); *G06T 2207/20221* (2013.01)

(56) References Cited

U.S. PATENT DOCUMENTS

| | | | | |
|---|---|---|---|---|
| 2016/0027218 A1* | 1/2016 | Salter | ............... | G02B 27/0093 345/633 |
| 2018/0106999 A1* | 4/2018 | Wilson | ............... | G06F 3/0304 |
| 2018/0350257 A1* | 12/2018 | Picard | ............... | G06F 3/013 |
| 2019/0076014 A1* | 3/2019 | Ryan | ............... | G06V 40/19 |
| 2019/0129501 A1* | 5/2019 | Nistico | ............... | G06V 40/19 |
| 2019/0324276 A1* | 10/2019 | Edwin | ............... | G06V 20/20 |
| 2019/0339770 A1* | 11/2019 | Kurlethimar | ............... | G02B 27/017 |
| 2020/0257357 A1* | 8/2020 | Ren | ............... | G06T 7/246 |
| 2021/0173474 A1 | 6/2021 | Sztuk et al. | | |
| 2022/0083134 A1 | 3/2022 | Kassner et al. | | |
| 2023/0393653 A1* | 12/2023 | Chernyak | ............... | G06F 3/013 |

FOREIGN PATENT DOCUMENTS

| | | |
|---|---|---|
| JP | 2019512726 A | 5/2019 |
| JP | 2019519859 A | 7/2019 |

OTHER PUBLICATIONS

International Search Report dated Jan. 11, 2022 for International Application No. PCT/IB2021/059328.

Yamada "Characteristics of Head and Eye Co-ordination When Viewing Targets on a Two-dimensional Plane", NHK Technical Research R&D; May 15, 1994; No. 30. pp. 58-73.

Office Action for U.S. Appl. No. 18/248,832, dated Sep. 24, 2025.

* cited by examiner

VIEWPOINT DETECTION DEVICE, CALIBRATION METHOD, AND PROGRAM

TECHNICAL FIELD

The present invention relates to the gaze detection apparatus, calibration method, and program.

BACKGROUND ART

In order to provide virtual reality (VR) in games and videos, the spread of head-mounted displays that can provide stereoscopic images is accelerating. A head mount display is an image providing device that provides a stereoscopic image to a user within a housing overlying the user's head. In such a head mount display, there is also known a device configured to vary the stereoscopic image, such as providing a gaze detector for detecting a user's gaze direction, and improving the resolution of only the image in the gaze direction.

In such a gaze detector, it is necessary to perform a calibration operation that matches the direction in which the user actually sees and the direction in which the gaze detector detects. Conventional devices present calibration indicators at multiple locations and prompt the user to see the indicator. The gaze direction is detected by the gaze detector while the user is looking at the indicator. The calibration can be performed by calculating the difference between the detected gaze direction and the actual gaze direction (direction to the indicator) (see, e.g., Patent Literature 1).

However, in the case where a plurality of indicators are presented sequentially, the detection signal may not be obtained in the gaze detector due to the occurrence of blinking or noise, and in such a case, the detection operation is repeated again. Therefore, it takes a long time to perform the calibration and places a burden on the user.

CITATION LIST

Patent Literature

[PTL 1] Japanese Patent Application Publication No. 2019-21049

SUMMARY OF INVENTION

Technical Problem

The present invention is intended to provide a gaze detection apparatus, a calibration method, and a program capable of performing calibration operations accurately and quickly.

Solution to Problem

The gaze detection apparatus according to the present invention comprises: an indicator presenting unit that presents an indicator to eyes and continuously moves the indicator in accordance with a predetermined trajectory; a gaze detecting unit that detects a gaze point of the eyes; and a numerical optimization problem solving unit that solves a numerical optimization problem in order to find a correction that converts a first set of detected plurality of the gaze points into a second set that satisfies a particular condition with respect to the predetermined trajectory.

Advantageous Effects of Invention

According to the present invention, a gaze detection device, a calibration method, and a program that can accurately and quickly perform a calibration operation can be provided.

DESCRIPTION OF EMBODIMENTS

Hereinafter, the present embodiment will be described with reference to the accompanying drawings. In the accompanying drawings, functionally identical elements may be represented by the same number. Although the accompanying drawings illustrate embodiments and implementations in accordance with the principles of the present disclosure, they are for the understanding of the present disclosure and are not used in any way to construe the present disclosure in a limiting manner. The description herein is merely an exemplary example and is not intended to limit the scope or application of the claims of the present disclosure in any sense.

In this embodiment, the description is given in sufficient detail to enable a person skilled in the art to implement the present disclosure, but it is necessary to understand that other implementations and forms are possible, and that changes in configuration and structure and the substitution of various elements are possible without departing from the scope and spirit of the technical ideas of the present disclosure. Accordingly, the following statements shall not be construed as limiting them.

The contents of embodiments of the present invention will be described with reference. One embodiment of the present invention includes the following configuration.

[Item 1]

A gaze detection apparatus comprising:
an indicator presenting unit that presents an indicator to eyes and continuously moves the indicator in accordance with a predetermined trajectory;
a gaze detecting unit that detects a gaze point of the eyes; and
a numerical optimization problem solving unit that solves a numerical optimization problem in order to find a correction that converts a first set of detected plurality of the gaze points into a second set that satisfies a particular condition with respect to the predetermined trajectory.

[Item 2]

The gaze detection apparatus according to item 1, wherein the numerical optimization problem solving unit finds the correction for converting the first set of the detected gaze points to the second set nearest to the predetermined trajectory.

[Item 3]

The gaze detection apparatus according to item 1, wherein the numerical optimization problem solver uses a fragment of the predetermined trajectory for each of the gaze points in the first set of the detected gaze points.

[Item 4]

The gaze detection apparatus according to item 1 or 2, wherein the numerical optimization problem solving unit uses the wait time information as a constraint in optimization.

[Item 5]

The gaze detection apparatus according to item 3, wherein fragments of the predetermined trajectory are selected based on latency information.

[Item 6]

A calibration method executed by a computer, the method comprising:
a step of presenting an indicator to eyes and continuously moving the indicator in accordance with a predetermined trajectory;
a step of detecting a gaze point of the eyes; and
a step of solving a numerical optimization problem in order to find a correction that converts a first set of detected plurality of the gaze points into a second set that satisfies a particular condition with respect to the predetermined trajectory.

[Item 7]

A program for make a computer to execute:
a step of presenting an indicator to eyes and continuously moving the indicator in accordance with a predetermined trajectory;
a step of detecting a gaze point of the eyes; and
a step of solving a numerical optimization problem in order to find a correction that converts a first set of detected plurality of the gaze points into a second set that satisfies a particular condition with respect to the predetermined trajectory.

First Embodiment

Figure 1:
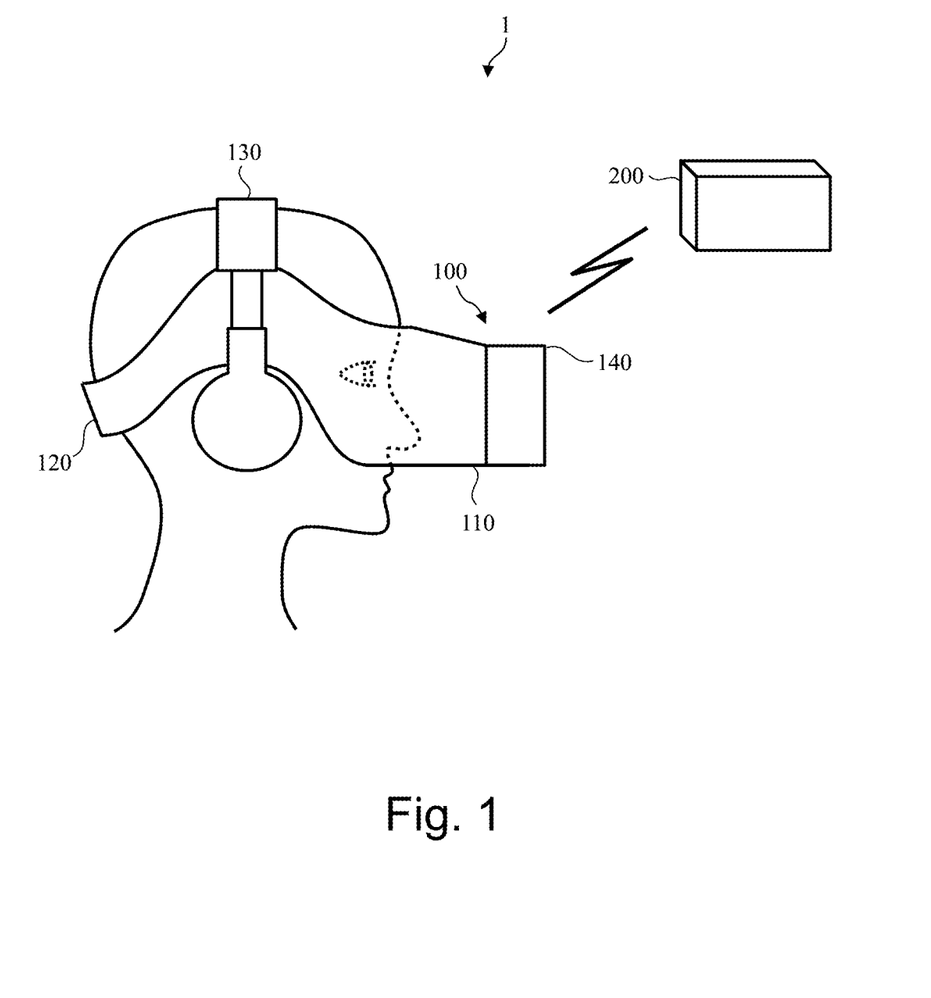
FIG. 1 is a schematic view illustrating an overview of the image system 1 according to the first embodiment.

Referring to FIG. 1, the video system 1 according to the first embodiment will be described. FIG. 1 is a diagram schematically illustrating an overview of the video system 1. The video system 1 according to the first embodiment includes the head mount display 100 and the video playback device 200. As shown in FIG. 1, the head mount display 100 may be a shielded head mount display that is mounted on the user's head.

The video playback device 200 generates video data displayed by the head mount display 100 and transmits the video data to the head mount display 100 either by wire or over the wireless. As an example, the video playback device 200 is a device capable of playing back videos such as a personal computer, a stationary game machine, a portable game machine, a tablet terminal, a smartphone, a tablet, a fablet, a video player, a television, and the like.

The wireless connection between the video playback device 200 and the head mount display 100 can be realized using, for example, known Wi-Fi, Bluetooth, infrared communication, and the like. The transmission of video between the head mount display 100 and the video playback device 200 is also carried out in accordance with standards such as Miracast (trademark), WiGig (trademark), WHDI (trademark), or Ethernet (trademark). The video playback device 200 may be integral with the head mount display 100 or may be incorporated into the head mount display 100.

The head mount display 100 includes a housing 110, the head fixture 120, the headphone 130, and the video display unit 140. As described below, the housing 110 includes the transmission module and various sensors in addition to the video display unit 140. The head fixture 120 is a member that mounts the head mount display 100 to the user's head.

The headphone 130 outputs the sound of the image to be played by the video playback device 200. Although not shown, the head mount display 100 may include a gyro sensor for detecting an inclination direction or the like of the head mount display 100. The video playback device 200 can change the display state of the image according to the detection result of the gyroscope. The video display unit 140 is housed in the housing 110 and displays the video transmitted from the video playback device 200.

Figure 2:
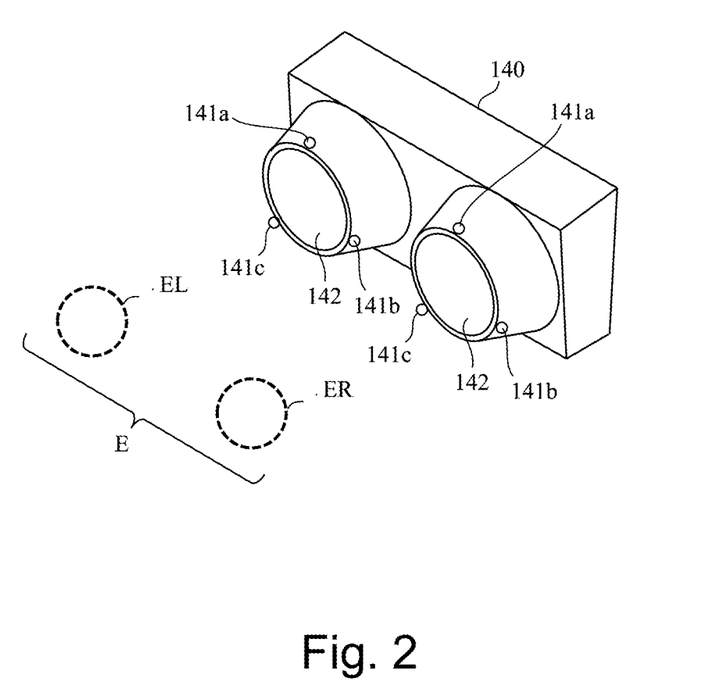
FIG. 2 is a perspective view schematically illustrating the configuration of the video display unit 140 according to the first embodiment.
Figure 3:
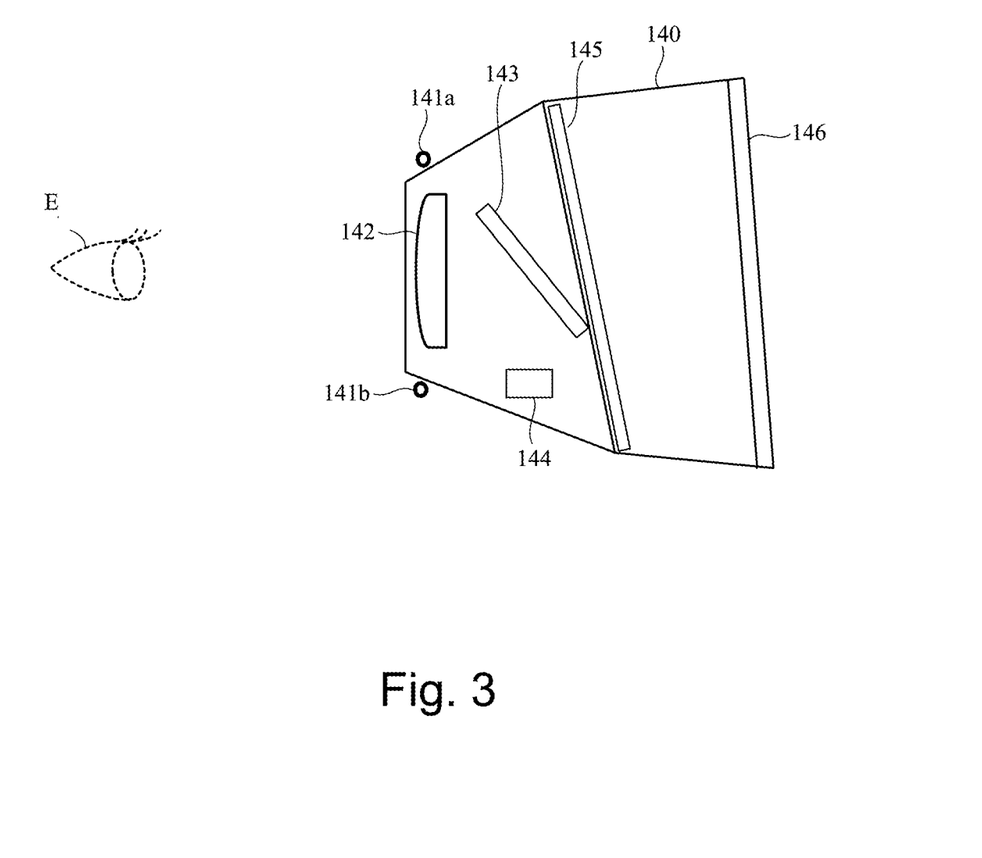
FIG. 3 is a schematic cross-sectional view schematically illustrating the configuration of the video display unit 140 according to the first embodiment.
Figure 4:
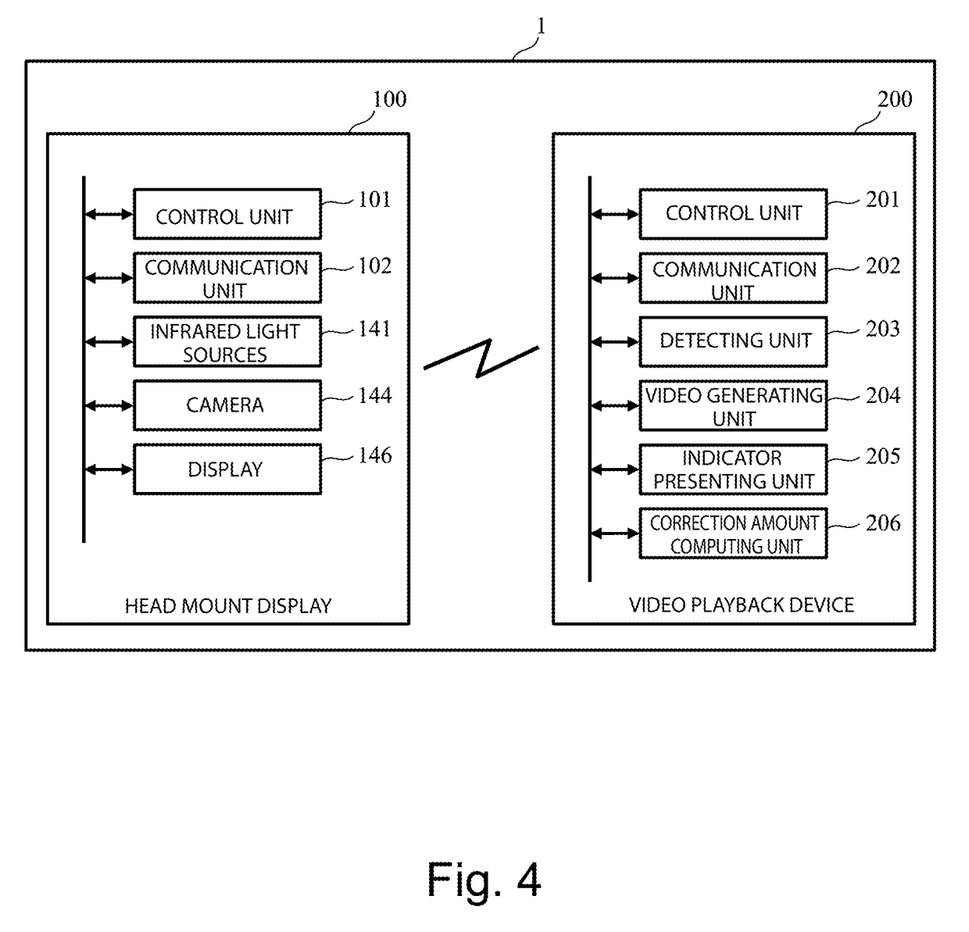
FIG. 4 is a block diagram illustrating a configuration of a main portion of the head mount display 100 and the video playback device 200 of the first embodiment.

FIG. 2 is a perspective view schematically illustrating the configuration of the video display unit 140, and FIG. 3 is a schematic cross-sectional view thereof. FIG. 4 is a block diagram illustrating a configuration of a main portion of a head mount display 100 and the video playback device 200.

As shown in FIG. 2, the video display unit 140 presents an image to each of the user's left and right eyes E (EL, ER), thereby allowing to present a three-dimensional image to the user. As shown in FIG. 3, the video display unit 140 includes the infrared light sources 141 (141a-c), the objective lens 142, the half mirror 143, the camera 144, the hot mirror 145, and the display 146. Since the configuration of the video display unit 140 is the same in the right and left eyes E, only the configuration on the right and left sides will be described below.

The infrared light sources 141 are light sources for detecting the center of the pupil of the eye, the position of the center of the cornea, and further for detecting the position of the center of the eyeball, and for detecting the gaze of eye E, which are capable of illuminating a near infrared wavelength band of light (about 780 nm to 2500 nm). The infrared light sources 141 are provided with at least three or more. As an example, three infrared light sources 141a-c are provided (infrared light sources 141c are not shown in FIG. 3). Hereinafter, the infrared light sources 141a-c are collectively referred to as an "infrared light source 141."

The objective lens 142 is provided to be located in front of the user's eye E when using the head mount display 100. The infrared light sources 141a-c may be provided around the objective lens 142. Here, the three infrared light sources 141*a-c* are preferably disposed at least in asymmetrical position with respect to the optical axis of the objective lens 142 and preferably at approximately equal angles around the optical axis.

The optical path between the objective lens 142 and the display 146 is provided with a half mirror 143 and a hot mirror 145. The half mirror 143 transmits a portion of the light from eye E and reflects the rest. The camera 144 is placed on the optical path of the reflected side of the half mirror 143, and the hot mirror 145 is placed on the optical path of the transmitted side.

The camera 144 is an imaging device for imaging an image of the eye E in which light from infrared light source 141 is projected to form a bright spot based on the light. The image of the eye containing this bright spot is used to detect the center of the pupil of the eye and the center of the cornea, and hence the gaze direction. The display 146 is an image display device for displaying images transmitted from video playback device 200, which may be implemented, for example, using a known liquid crystal display or an organic EL display. The hot mirror 145 has the property that visible light emitted by display 146 is transmitted while near infrared light is reflected.

The infrared light reaching the user's eye E from infrared light sources 141*a-c* is reflected by the eye E and directed toward the objective lens 142. A portion of the light transmitted through the objective lens 142 is reflected by the half mirror 143 and enters the camera 144. The camera 144 may include a filter (not shown) that blocks visible light.

As shown in the block diagram of FIG. 4, the head mount display 100 includes the control unit 101 and the communication unit 102 in addition to the infrared light sources 141, the camera 144, and the display 146. The control unit 101 controls the entire head mount display 100 including the infrared light sources 141, the camera 144, and the display 146. The communication unit 102 performs data communication between the video playback device 200.

The video playback device 200 includes the detecting unit 203 and the control unit 201 (a processor) for controlling the video generating unit 204, and a communication unit 202 for controlling data communication between the head mount display 100. The communication unit 202 communicates with the communication unit 102 in the head mount display 100 and receives various data obtained in the head mount display 100 to supply the control unit 201. Conversely, the communication unit 202 transmits data obtained in the video playback device 200 to the head mount display 100. The video playback device 200 includes the detecting unit 203 and the video generating unit 204.

The detecting unit 203 detects the center of the pupil of the user's eye, the position of the center of the cornea, and even the position of the center of the eyeball based on the image of eye E imaged by camera 144 with infrared light from infrared light sources 141*a-c* projected to eye E. The detecting unit 203 then detects the gaze direction of eye E based on the data of the center of the pupil, the center of the cornea, and/or the center of the eyeball. The video generating unit 204 generates various videos to be displayed on the display 146 and transmits them to the head mount display 100 via the communication unit 202.

Figure 5:
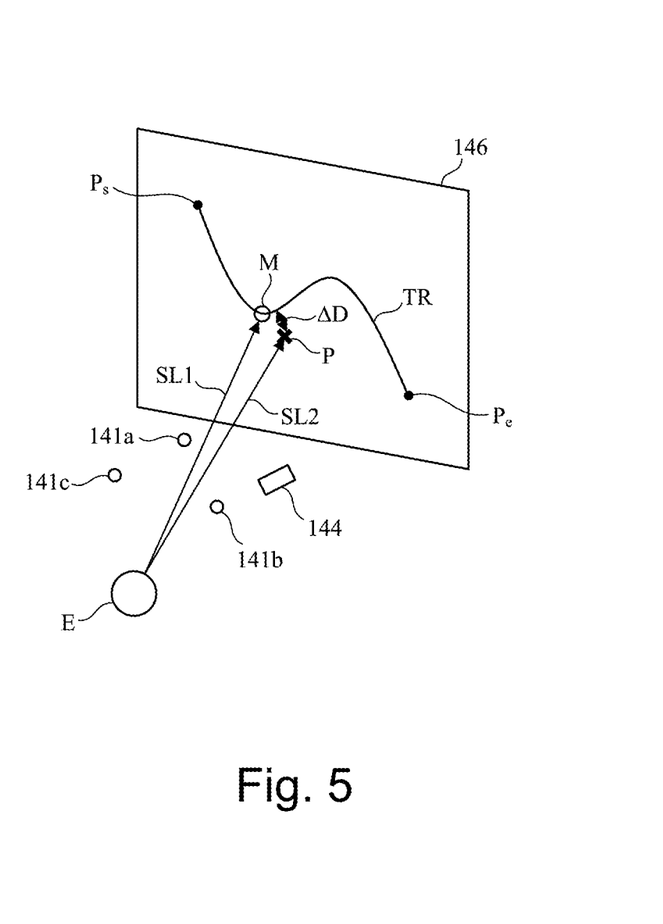
FIG. 5 is a conceptual diagram illustrating the operation of the indicator presenting unit 205 and the correction amount computing unit 206 according to the first embodiment.

The video playback device 200 includes the indicator presenting unit 205 and the correction amount computing unit 206 as a configuration for executing a calibration operation in the detecting unit 203. The indicator presenting unit 205 causes the display 146 to display an indicator M for the user to gaze during the calibration operation. As shown in FIG. 5, the indicator presenting unit 205 is configured to continuously move the indicator M along the predetermined trajectory TR. The movement may be continuous, and the speed of movement may be constant or variable. The shape of the trajectory TR is also irrelevant as long as the calibration operation is feasible. In the example of FIG. 5, the trajectory TR is defined as an open curve with a starting point Ps and an end point Pe, but may be a closed curve. As an example, the curve may include a parabola, a conical curve, a spiral, a reservoir curve, a cycloid curve, a closoid curve, a straight line, or a combination thereof.

In the calibration operation, the image of eye E illuminated by infrared light sources 141*a-c* is imaged with camera 144 while the indicator M is continuously moved along the trajectory TR on display 146 by the indicator presenting unit 205.

Then, the detecting unit 203 analyzes the position of the bright spots based on the infrared light sources 141*a* to 14*c* formed on the cornea using the imaging image of the camera 144 and identifies the position of the corneal center according to the analysis result. The detecting unit 203 also identifies the center position of the pupil according to the imaging image of the camera 144 and also identifies the center position of the eyeball. The gaze detection is performed by the detecting unit 20 according to the data identified in this manner.

When the indicator M moving along the trajectory TR is viewed by the user to perform a calibration operation, the gaze direction SL2 detected by the detecting unit 203 ideally matches the trajectory TR. However, due to individual differences of the user, misalignment of the housing 110 with the user's head, assembly errors, or other reasons, the gaze direction SL2 detected by the detecting unit 203 does not correspond to the direction SL1 towards the trajectory TR (true direction (Ground Truth)). The detecting unit 203 determines that the screen of the display 146 is gazed at the point $P_i$ at which the gaze direction SL2 intersects, and this point $P_i$ may not match the position of the indicator M. Since the index t represents the time stamp below, all of the above $P_i$ is replaced by Pt.

Accordingly, in the video system 1 of the first embodiment, the calibration operation is performed, and the difference between the gaze direction SL2 detected by the detecting unit 203 and the direction SL1 (the direction to the indicator M) in which the user should actually see is calculated in the correction amount computing unit 206. The correction amount computing unit 206 computes the correction amount according to the calculation result. In this example, the correction amount is calculated by computing the position relationship, i.e., the distance ΔD, between the position of the point $P_i$ and the corresponding position of the indicator M.

The position of the indicator M corresponding to the detected point $P_i$ can be detected as a point on the trajectory TR (the nearest point) closest to the point $P_i$. Then, the distance between the nearest point and the point $P_i$ is calculated as the distance ΔD. The correction amount can be calculated by acquiring the data of the distance ΔD in a plurality of steps while continuously moving the indicator M. Specifically, the nearest point from the point $P_i$ can be obtained by solving the following formula. The optimization algorithm may be used to minimize the total distance between the calibrated point $P_t$ and the trajectory TR. Such optimization algorithm may be local or global, and may include, but are not limited to, the use of the gradient descent method, the least squares method, and the like.

$$\sum_{t} Dist(T(P-t, c), [TR]) \quad \text{[Equation 1]}$$

However, $\rightarrow T(\rightarrow e(t), \rightarrow c)$ is a calibration function for converting the position vector of the point $P_i \rightarrow e(t)$ to the position vector of the point on the trajectory TR (Curve). Further, $\rightarrow c$ is the calibration parameter used in the calibration function $\rightarrow c$. In addition, Dist is a function indicating the distance between a point defined by the position vector $\rightarrow e$ and the point after conversion. The distance may be calculated as L2 norms or other similar methods. E also shows the moment that a sufficient number of bright spots can be obtained to perform the gaze detection, thereby providing data with sufficient reliability for the gaze detection. According to the above formula, the position on the nearest trajectory TR can be identified from the point $P_i$. Equation 2 defines the cost function of optimization for parameter c. The result of the minimization process yields the $c_{fin}$. This can be expressed in [Equation 2] for the cost function described above.

$$c_{fin} = \underset{c}{\operatorname{argmin}} \sum_{t} Dist(T(P_t, c), [TR]) \quad \text{[Equation 2]}$$

Once the calibration is complete, the $c_{fin}$ can be used for gaze correction in the following manner.

$$x^* = T(x, c_{fin}) \quad \text{[Equation 3]}$$

[Equation 3] converts the uncalibrated gaze output x to x* by applying the calibration transform T using the $c_{fin}$ calculated in [Equation 2]. This can improve the accuracy of the gaze tracking system.

Referring to the flowchart of FIG. 6, the procedure for executing the calibration operation in the video system 1 according to the first embodiment will be described. When the calibration operation is disclosed, firstly, the indicator presenting unit 205 displays the indicator M on the display 146 and starts the operation to continuously move along the trajectory TR (Step S11).

The detecting unit 203 detects the gaze direction SL2 (point $P_i$) of the eye E with the user gazing at the indicator M moving along the trajectory TR (Step S12). When the set of points $P_i$ is detected, the position of the indicator M on the trajectory TR corresponding to the point $P_i$ is determined, and c is set to a certain initial value $c_{init}$ (S13). Typically, the initial value satisfies the following equation for any x.

$$x = T(x, c_{init}) \quad \text{[Equation 3]}$$

Repeat optimization is then initiated. As shown in S14, each estimated gaze $P_t$ is corrected by the calibration transformation $T(P_t, c)$ and can be represented by Equation 5.

$$P_t^* = T(P_t, c) \quad \text{[Equation 5]}$$

Figure 8:
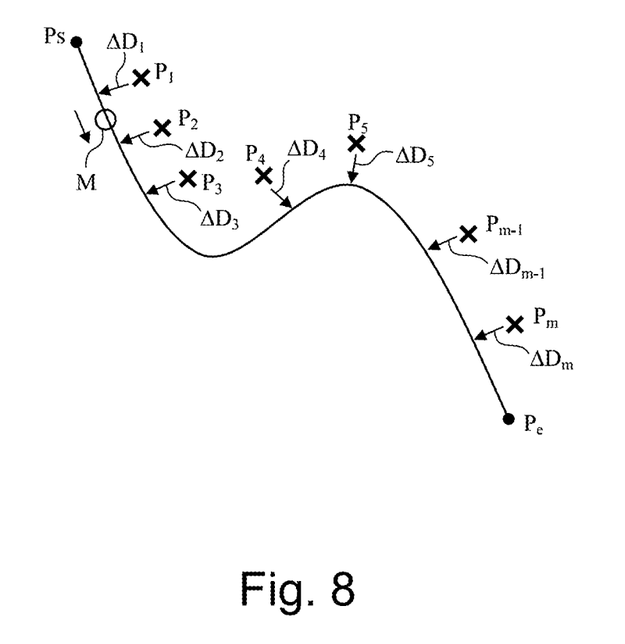
FIG. 8 is a schematic diagram illustrating an execution procedure of a calibration operation in the video system 1 according to the first embodiment.

Next, you can find the closest point on the trajectory TR for each $P_t^*$ at S15. In step S16, the cost function must be computed. In this embodiment, the cost function is the sum of the distances Dist($P_t^*$, [TR]). Then, in S17, the optimizer updates the parameter based on the cost value of the result. S18 checks the stopping condition and repeats S14-S18 as necessary. The stopping condition in this case includes, but is not limited to, the run time, the target cost value, etc. When the optimization process is complete, the last value of c becomes the cfm. In general, depending on the choice of the optimization algorithm, it may be necessary to perform several cost function calculations (S14-S16) using various parameters c in order to execute the iteration of optimization S17. By way of example, the location of the corresponding indicator M can be identified by identifying the nearest point from the point $P_i$ to the trajectory TR. When the position of the corresponding indicator M is specified, the distance ΔD between the position of the indicator M and the position of the point Pi is calculated (S14). As illustrated in FIG. 8, the steps S11 to S14 are performed multiple times during movement along the trajectory TR of the indicator M to acquire the data of a plurality of points $P_i$ ($P_1, P_2, \ldots, P_m$) and a plurality of distances ΔD ($\Delta D_1, \Delta D_2, \ldots, \Delta D_m$). Based on this plurality of distances ΔD ($\Delta D_1, \Delta D_2, \ldots, \Delta D_m$), the correction amount can be calculated.

Figure 9:
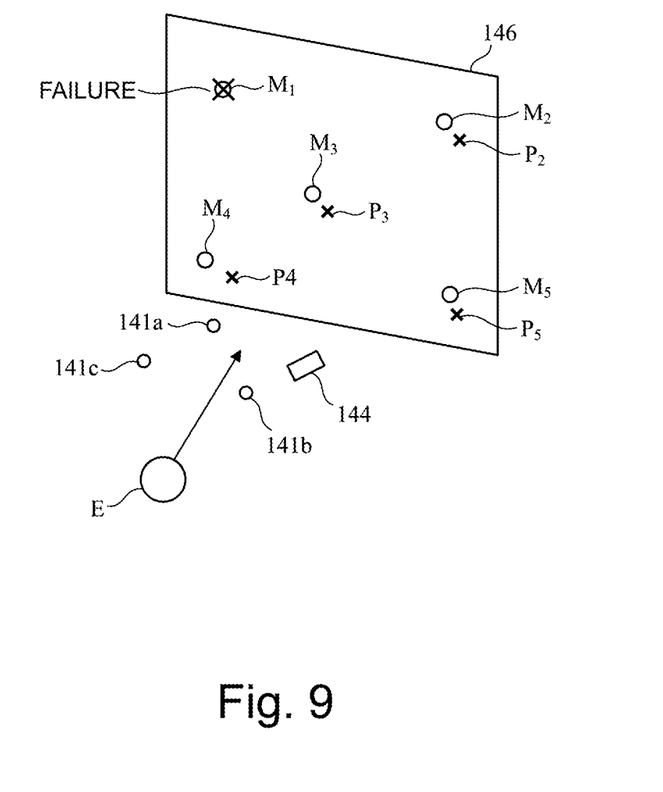
FIG. 9 is a schematic diagram illustrating a comparison example.

Referring to FIG. 9, the calibration operation in a comparative example will be described. In this comparative example, the indicator $M_i$ (i=1, 2, ...) is presented in a discrete (jump) sequence at a plurality of spaced locations on the display 146. Each time one of the plurality of indicators $M_i$ is projected, an infrared light is illuminated from the infrared light sources 141a-c, and a gaze direction is detected at the detecting unit 203 according to the information of the position of the bright spots of the infrared light sources 141a-c imaged by the camera 144, the position of the pupil, and/or the position of the center of the eyeball.

In this comparative example, if the gaze direction is detected corresponding to the position of all the indicators $M_i$, the calibration can be performed properly. In practice, however, due to the occurrence of blink, noise, and the like, it may fail to obtain data of the corresponding gaze direction for any of the presented plurality of indicator $M_i$. The higher the number of failures, the amount of data to perform the appropriate calibration is insufficient, the redo of the calibration operation is needed, and consequently the burden on the user becomes bigger.

In contrast, according to the method of the first embodiment shown in FIG. 5, the indicator M is presented continuously along the trajectory TR rather than presented discretely. If the indicator M moves continuously along the trajectory TR and the eye E tracks the movement of the indicator M, even if the blink or noise occurs discontinuously in the middle, the detecting unit 203 provides information on the plurality of points $P_i$, and the position of the corresponding indicator M can also be specified in each of the plurality of points $P_i$. Therefore, according to the method shown in FIGS. 5 and 6, the calibration operation can be performed accurately and quickly.

Second Embodiment

Figure 10:
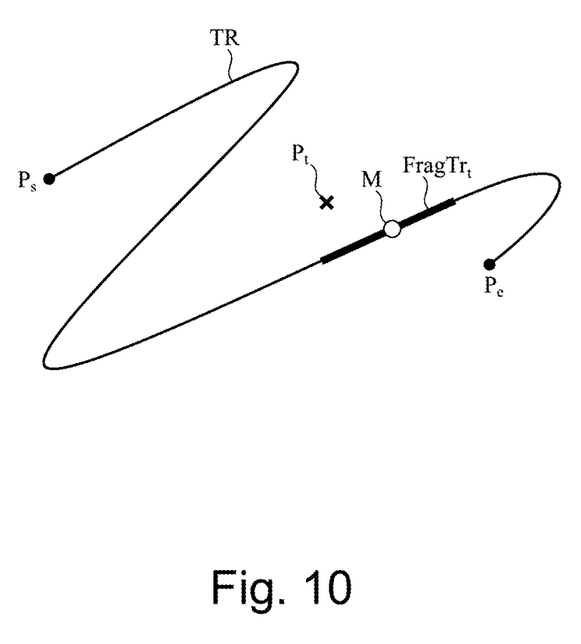
FIG. 10 is a schematic diagram illustrating an execution procedure of a calibration operation in the video system 1 according to the second embodiment.

Next, an image system 1 according to the second embodiment will be described with reference to FIG. 10. Since the overall configuration of the video system 1 is the same as that of the first embodiment (FIGS. 1 to 4), overlapping descriptions are omitted. The calibration operation is basically the same as the procedure shown in FIGS. 5 and 6.

Figure 6:
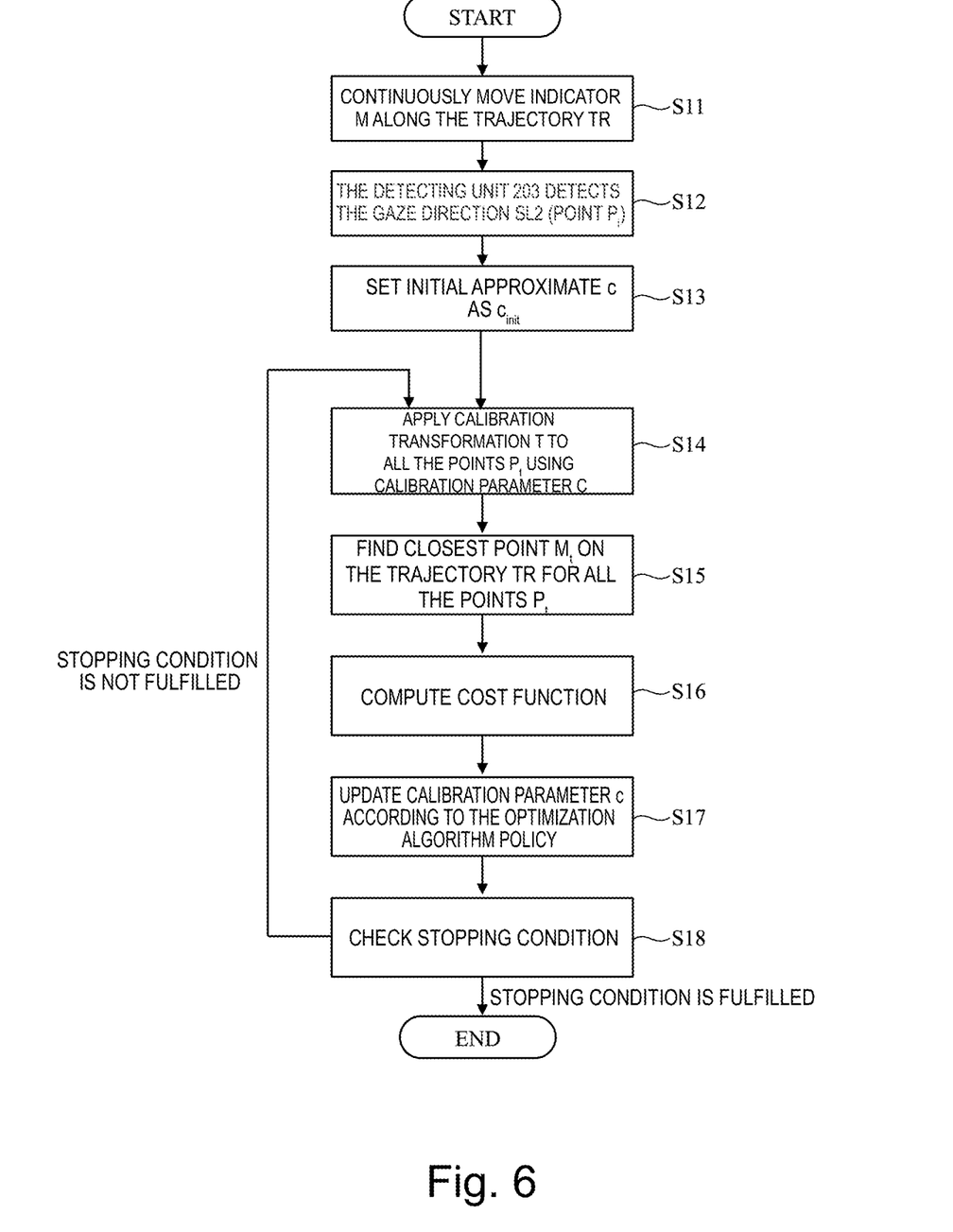
FIG. 6 is a flowchart illustrating an execution procedure of a calibration operation in the video system 1 according to the first embodiment.
Figure 7:
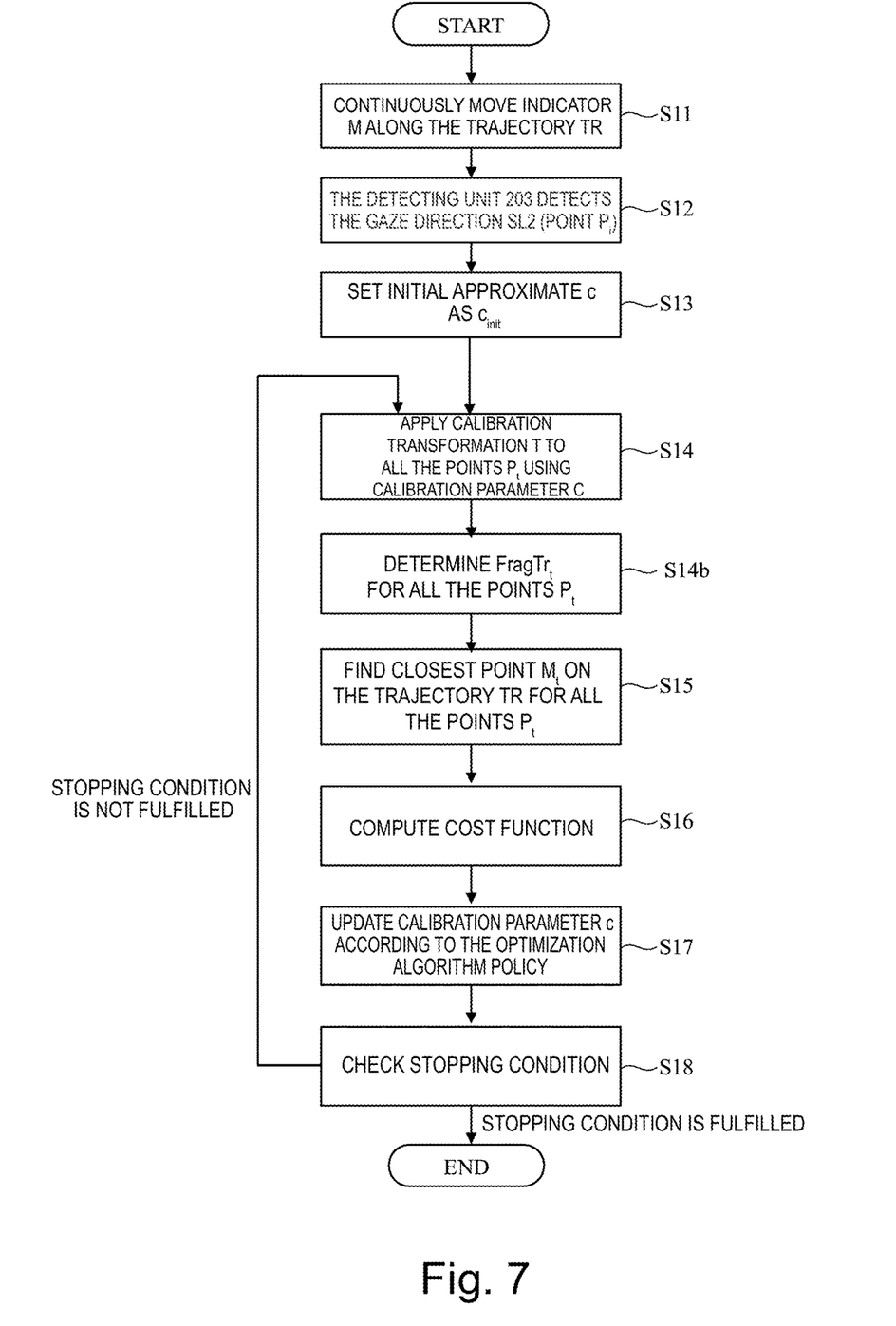
FIG. 7 is a flowchart illustrating an execution procedure of a calibration operation in the video system 1 according to the first embodiment.

However, the calibration operation of the second embodiment differs from the first embodiment in the method of determining the position of the indicator M corresponding to the point $P_i$ (the detail of step S13 of FIGS. 6 and 7). Specifically, in the first embodiment, the function Dist(x, Tr) was the distance from point x to the point closest to the x point on the trajectory TR. In the second embodiment, the fragment FragTr$_t$ of the trajectory TR is specified for each individual gaze output $P_t$. The overall process is identical to the first embodiment except for block S15. In the second embodiment of S15, $M_t$ is found as the closest point from $P_t$ on the fragment of the trajectory $FragTr_t$. As shown in FIG. 10, the trajectory TR is divided into a plurality of fragments CFs and the location of the indicator M corresponding to the point $P_i$ is identified in the fragment CF nearest to the detected point $P_i$.

The procedure for executing the calibration operation in the second embodiment, in particular, the method for identifying the position of the indicator M corresponding to the point $P_i$, will be described with reference to FIGS. 7 and 10. First, as in the first embodiment, an operation for continuously moving the indicator M along the trajectory TR is started (Step S11). The detecting unit 203 detects the gaze direction SL2 (the point $P_i$) of the eye E with the user gazing at the indicator M moving along the trajectory TR (Step S12).

When the point $P_i$ (the position vector→e(t)) is detected, the fragment CF ($→g(t−f1):→g(t+f2)$) nearest to this point Pi is identified and the point of proximity from the point $P_i$ within the fragment CF is identified based on the following formula. If all points $P_t$ are measured and each fragment of the curved $FragTr_t$ is associated with each $P_t$(S14b), the optimization problem is solved. For example, the optimization problem can be formulated by the following equation:

$$c_{fin} = \underset{c}{\operatorname{argmin}} \sum_t Dist(T(P_t, c), [FragTr_t]) \quad \text{[Equation 6]}$$

In addition, instead of Equation 6, the nearest neighbor point may be calculated by further multiplying the weighting factor w(t). The iterative process of this embodiment allows the fragments of the trajectory $FragTr_t$ to be adjusted for each iteration. In addition, an additional weight factor wt can be applied to each distance for each iteration to robustly cause the algorithm to robust against outliers. Therefore, wt may be updated for each iteration.

According to the video system 1 of the second embodiment, in the calibration operation, the relationship between the point $P_i$ detected by the detecting unit 203 and the corresponding point on the trajectory TR can be calculated based on a fragment made by dividing the trajectory TR. Thus, compared to the first embodiment, the computational load can be reduced and the calibration operation can be performed more quickly and accurately. The second embodiment also differs from the first embodiment by introducing an orbital fragment $FragTr_t$ into the cost function of optimization. This increases the likelihood that the local optimization algorithm will find the correct global minimum. In addition, the computational load can be reduced, and the calibration operation can be performed more quickly and accurately.

Third Embodiment

Next, the video system 1 according to a third embodiment will be described. Since the overall configuration of the video system 1 is the same as that of the first embodiment (FIGS. 1 to 4), overlapping descriptions are omitted. The calibration operation is basically the same as the procedure shown in FIGS. 5, 6, and 7.

However, the calibration operation of the third embodiment differs from the first embodiment in the method for determining the position of the indicator M corresponding to the point $P_i$ (the detail of step S13 of FIGS. 6 and 7). The calibration operation of the third embodiment differs from the second embodiment by specifying the $FragTr_t$. Specifically, in the third embodiment, the delay time information $T_L$ (latency) between the presentation of the indicator M and the detection of the point $P_i$ is obtained in advance, and the position of the indicator M corresponding to the point $P_i FragTr_t$ is specified according to this delay time information $\Delta T$.

Figure 11:
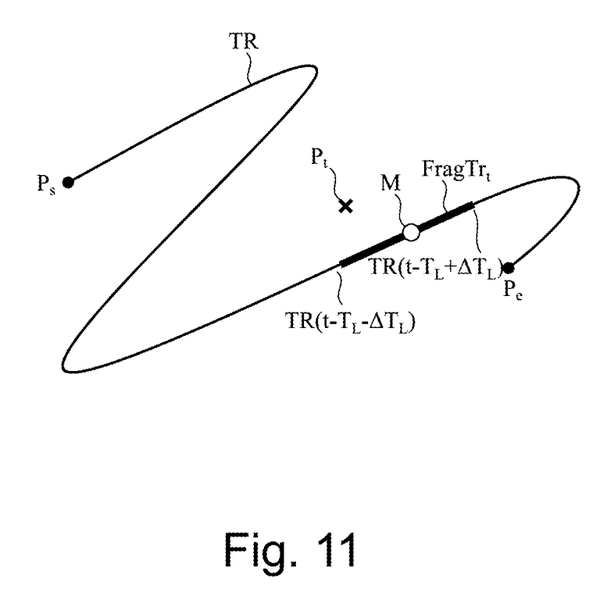
FIG. 11 is a schematic diagram illustrating an execution procedure of a calibration operation in the video system 1 according to the third embodiment.

The procedure for executing the calibration operation in the third embodiment, in particular, the method for determining the position of the indicator M corresponding to the point $P_i$, will be described with reference to FIGS. 6 and 11.

First, as in the first embodiment, the operation for continuously moving the indicator M along the trajectory TR is started (Step S11). Thereafter, the detecting unit 203 detects the gaze direction SL2 (point Pt) of the eye E while the user is gazing at the indicator M moving along the trajectory TR (Step S12). At this point, the time stamp t can be defined as the instant at which the detecting unit 203 detects the gaze $P_t$. Accordingly, the trajectory TR can be represented as a time-parameterized trajectory. The movement control of the indicator M is performed according to a predetermined time table (FIG. 11). For example, at the start of movement (elapsed time $T_{elp}=0$), the indicator M is at the starting point $P_s$ ($X_s$, $Y_s$), and at the elapsed time $T_{elp}=T_e$, the indicator M is moved to the end point $P_e$ (coordinate ($X_e$, $Y_e$)). The position (coordinate data) of the indicator M at each elapsed time Telp is also stored in the timetable in advance. The information of the delay time information $\Delta T$ from when the indicator M is presented to a position on the trajectory TR until a point $P_i$ is determined is also stored in advance.

The detecting unit 203 detects the gaze direction SL2 (point $P_i$) of the eye E with the user gazing at the indicator M moving along the trajectory TR (Step S12). When a point $P_i$(coordinate ($X_{pj}$, $Y_{pj}$)) is detected at a certain elapsed time, e.g., elapsed time $T_{elp}=Tj$, the position of the indicator M corresponding to this point $P_i$ is determined according to the time table and the delay time information $\Delta T$ (Step S13). When the position of the corresponding indicator M is determined, the position relationship or distance $\Delta D$ between the indicator M and the point $P_i$ is computed in the same manner as in the first embodiment (Step S14). The fragment $FragTr_t$ can then be specified in relation to the time t (when $P_t$ measurement is completed) and depends on the estimated latency of the system $T_L$.

$$FragTr_t = \{Tr(t^*): t^* \in [t-T_L-\Delta T_L; t-T_L+\Delta T_L]\} \quad \text{[Equation 7]}$$

In this embodiment, the fragment $FragTr_t$ is shifted from the time at which $P_t$ is measured to the time $T_L$. The length of the fragment is $2\Delta T_L$.

Thus, in the third embodiment, the position of the indicator M corresponding to the point $P_i$ determined by the detecting unit 203 is determined according to the delay time information $\Delta T$. This method may also have the same effect as in the aforementioned embodiments. Since the delay time information $\Delta T$ is pre-calculated and stored, the determination of the indicator M may be made by referring only to the time table, so the computing load of the calculation of the correction amount is smaller than that of the above-described embodiment. As noted above, in the third embodiment, it is proposed that the $FragTr_t$ relate to the latency of the system $T_L$. The system latency may be measured automatically or set externally. The system latency may include technical latency (e.g., caused by data transmission, processing time, etc.) and physiological latency (the time required for a person to catch up with the position of the indicator M).

[Others]

The present invention is not limited to the above-described embodiments, but includes various modifications. For example, the above-described embodiments are described in detail in order to explain the present invention in an easy-to-understand manner, and are not necessarily limited to those having all the configurations described. It is also possible to replace a portion of the configuration of one embodiment with the configuration of another embodiment, and to add a configuration of another embodiment to the configuration of one embodiment. In addition, it is possible to add, delete, or replace another configuration with a part of the configuration of each embodiment. For example, although the embodiments described above primarily illustrate an example in which the gaze detection device is mounted in the video system having the head mount display 100, the scope of the gaze detection device of the present invention is not limited thereto, and may be applied to various devices and systems that can use the gaze detection function.

In the above-described embodiment, the processor in the gaze detection device executes a gaze detection program, etc. to specify the gaze direction, etc. of the user. However, the gaze detection device may be realized by hardware such as a logic circuit or a dedicated circuit formed in the integrated circuit. These circuits may also be implemented by one or more integrated circuits, and the plurality of functional blocks illustrated in the above-described embodiments may be implemented by one integrated circuit.

The gaze detection program may be recorded on a recording medium readable by the processor, and a "non-transient tangible medium" may be used as the recording medium, for example, a tape, a disk, a card, a semiconductor memory, a programmable logic circuit, or the like.

REFERENCE SIGNS LIST

1 . . . Video System
100 . . . Head Mount Display
101 . . . Control Unit
101 . . . Communication Unit
110 . . . Housing
120 . . . Head Fixation
130 . . . Headphone
140 . . . Video Display Unit
141, 141a-c . . . Infrared Light Sources
142 . . . Objective Lens
143 . . . Half Mirror
144 . . . Camera
145 . . . Hot Mirror
146 . . . Display
200 . . . Video Playback Device
201 . . . Control Unit (Processor)
202 . . . Communication Unit
203 . . . Detecting Unit
204 . . . Video Generating Unit
205 . . . Indicator Presenting Unit
206 . . . Correction Amount Computing Unit

The invention claimed is:

1. A gaze detection apparatus comprising:
an indicator presenting unit that presents an indicator to eyes and continuously moves the indicator in accordance with a predetermined trajectory;
a gaze detecting unit that detects a gaze point of the eyes; and
a numerical optimization problem solving unit that solves a numerical optimization problem in order to find a correction that converts a first set of detected plurality of the gaze points into a second set that satisfies a particular condition with respect to the predetermined trajectory,
wherein the numerical optimization problem solving unit identifies a position of the indicator on a nearest fragment of the predetermined trajectory for each of the gaze points in the first set of the detected gaze points.

2. The gaze detection apparatus according to claim 1, wherein the numerical optimization problem solving unit uses wait time information as a constraint in optimization.

3. The gaze detection apparatus according to claim 1, wherein fragments of the predetermined trajectory are selected based on latency information.

4. A calibration method performed by a gaze detection apparatus, the method comprising:
a step of presenting, by an indicator presenting unit, an indicator to eyes and continuously moving the indicator in accordance with a predetermined trajectory;
a step of detecting, by a gaze detecting unit, a gaze point of the eyes; and
a step of solving, by a numerical optimization problem solving unit, a numerical optimization problem in order to find a correction that converts a first set of detected gaze points into a second set that satisfies a particular condition with respect to the predetermined trajectory,
wherein the method further comprises identifying, by the numerical optimization problem solving unit, a position of the indicator on a nearest fragment of the predetermined trajectory for each of the gaze points in the first set of the detected gaze points.

5. A non-transitory computer readable medium having stored thereon computer-executable codes, which, when executed by a processor, perform a method comprising:
a step of presenting an indicator to eyes and continuously moving the indicator in accordance with a predetermined trajectory;
a step of detecting a gaze point of the eyes; and
a step of solving a numerical optimization problem in order to find a correction that converts a first set of detected gaze points into a second set that satisfies a particular condition with respect to the predetermined trajectory,
wherein the method further comprises identifying a position of the indicator on a nearest fragment of the predetermined trajectory for each of the gaze points in the first set of the detected gaze points.

* * * * *